April 14, 1964     A. M. YOUNG     3,128,829
VARIABLE DIAMETER PROPELLER
Filed Oct. 24, 1962     6 Sheets-Sheet 1

INVENTOR.
ARTHUR M. YOUNG
BY
         ATTORNEYS April 14, 1964

A. M. YOUNG 3,128,829

VARIABLE DIAMETER PROPELLER

Filed Oct. 24, 1962

INVENTOR.
ARTHUR M. YOUNG
BY
ATTORNEYS

INVENTOR.
ARTHUR M. YOUNG
BY Kenyon & Kenyon
ATTORNEYS

Fig. 8.

April 14, 1964   A. M. YOUNG   3,128,829
VARIABLE DIAMETER PROPELLER
Filed Oct. 24, 1962   6 Sheets-Sheet 6

INVENTOR.
ARTHUR M. YOUNG
BY
Kenyon & Kenyon
ATTORNEYS

United States Patent Office 3,128,829
Patented Apr. 14, 1964

3,128,829
VARIABLE DIAMETER PROPELLER
Arthur M. Young, Paoli, Pa.
Filed Oct. 24, 1962, Ser. No. 232,741
9 Claims. (Cl. 170—160.11)

This invention relates to a propeller. More particularly, this invention relates to a variable diameter propeller having blades which, at the will of the operator, can be increased or decreased in length while the propeller is in operation.

This propeller may be used on a convertiplane type aircraft, that is, one which is capable of taking off, flying and landing as a helicopter and also is capable of being readily converted into an airplane for forward flight at high speed.

In convertiplanes the art is confronted with the problem of providing thrust means that have the capability both of lifting the aircraft in its helicopter phase, and propelling it forward at high velocity in the airplane phase. To provide a propeller that is suitable both for the helicopter phase and for the airplane phase leads to what may be called the predicament of convertiplane design.

This predicament stems from a law of physics that states that power is the product of force times velocity, and we may, with a given power input, have either a large force at low velocity (such as the lift of a helicopter rotor) or a small force at high velocity (such as the thrust of an airplane propeller, or to take a more extreme case the thrust of a jet engine).

All aircraft depend for their motion on imparting to the air a rearward or downward velocity, and employ for this either rotors (as in helicopters), propellers or jet engines (as in airplanes), or explosive gases (as in rockets). If we consider the diameter of this jet of air we will note that it is great for the slow speed vehicle and grows progressively less as the velocity which the aircraft is capable of attaining is greater. Thus the large helicopter rotor and the large diameter column of air it moves is associated with a velocity of vertical climb of some 20 miles per hour, the 10 foot airplane propeller with a velocity of some 200 miles per hour, the 3 foot jet with a velocity of some 600 miles per hour, and the six inch rocket orifice with a velocity of say 2,000 miles per hour. Consequently, as the diameter of the jet stream is reduced, the velocity at which thrust is available increases and the thrust it produces (for a given power) is reduced.

This principle then requires that the diameter of the thrust means or the diameter of the jet of air acted on, be reduced as the velocity expected of the craft increases. But fortunately for the designer this principle allows leeway and permits a given device such as a propeller to have a considerable range of velocity over which it is efficient. Thus an airplane propeller which is designed for maximum efficiency at the cruising speed of the airplane, is still reasonably efficient at lower and at higher speeds so that over a range of speed of from say 100 miles per hour (take off speed) to 300 miles per hour (top speed) the airplane propeller is within a few percent of maximum efficiency. This result stems from the nature of the curve of efficiency against velocity, this curve rising to a maximum and then falling off, but having near the maximum a region where it is substantially flat, that is, in which the efficiency does not drop off more than a few percent. Beyond this region the efficiency however falls at a progressively greater rate.

This range of speed in which reasonable efficiency is possible underlies not only propellers but all aerodynamics devices, and makes it possible for the airplane wing to have a speed range of about 3 to 1. It even, in an indirect manner, makes possible the translational motion of the helicopter by permitting differential air velocity over the advancing and retreating helicopter blades.

Therefore, the fundamental curve that would show diameter of the thrust means versus speed must be modified and must be visualized not as a sharp line, but as a broad band whose center moves down (indicating a smaller diameter) as the velocity increases.

Convertiplanes at this writing have been successful in proving the fundamental principle that an aircraft may be designed which takes off as a helicopter and converts to flight as an airplane. But such devices have been disappointing in performance or speed. Either they have used a small diameter propeller in both the helicopter and airplane phases thus retaining the high speed quality of an airplane in both phases at the expense of very limited load capacity (only 3 lbs. per horsepower), or they have used large diameter rotors in both phases and had a maximum speed only slightly in excess of a pure helicopter. In either case they have not justified the claims made for the convertiplane, i.e., that it would combine the vertical lift of a helicopter with the speed of an airplane.

In order to improve such performance it is necessary to attain good efficiency at both ends of the speed range. This means that, if the same propeller is to be used for thrust and for propulsion, the speed range of the propeller must be extended well beyond the 3:1 value available normally. It has in fact to be extended by as much as the speed is to be increased over that of a pure helicopter of the same lifting capacity and power. This is not possible in devices now in use.

The present invention deals with the problem of obtaining efficiency at both ends of the speed range by providing means for varying the propeller diameter so that for take-off and landings the rotor is expanded and in high speed flight it is contracted.

A superficial consideration might seem to require a change in diameter from say 40 feet as a helicopter rotor to one of say 10 feet as an airplane propeller, but such a change (which would be very difficult from a mechanical standpoint) is not necessary or even desirable as can be shown from theoretical considerations, confirmed by extensive tests made by the applicant to establish this design criterion.

It is in order, therefore, to explain why the present invention improves the high speed efficiency without having to make the large change of diameter (from 40 feet to 10 feet, for example).

It should first be noted that an airplane for reasons of ground clearance, engine r.p.m., etc., favors as small a propeller as efficiency will permit, and that generally speaking, a helicopter, whose lift is supplied at all times by the rotor, uses as large a rotor as is conveniently possible, because other factors being equal, the power required is inversely proportional to the rotor diameter.

Therefore, it must be realized that for a convertiplane, which operates only for a short time as a direct lift device, the ideal rotor diameter for the helicopter phase may be smaller than the pure helicopter, and also that in the airplane phase the ideal propeller may be considerably larger than is customary in a pure airplane. This brings the two requirements closer and reduces the percentage change of diameter required. To discover what this change of diameter should be more accurately, it is necessary to make some brief computations.

The basic formula for rotors of similar proportions is:

Power required=$C_p n^3 d^5$ where $C_p$ is power coefficient
$n$ is r.p.m.
$d$ is diameter The formula for torque is similar but $n$ here occurs to the second power:

$$\text{Torque} = C_p n^2 d^5$$

The problem in switching from a low velocity to a high velocity is the variation in $C_p$—the power coefficient. This changes rapidly with the pitch setting of the propeller, and its values may be determined from NACA and other tests of propellers. A typical value of $C_p$ for angles of attack suitable for helicopter lift is of the order of .1, and a value of $C_p$ for the airplane phase (say 45°) is .5, i.e., a five fold spread. This implies that for the condition of constant rotor or propeller r.p.m. the power coefficient for the airplane condition will be five times the power coefficient for the helicopter condition. This difference in power coefficient is to be compensated by a change in diameter, so that actual torque on the engine shaft is constant.

However, the formula above involving diameter to the fifth power cannot be used because this formula is for similar blade shapes, and it is here proposed that the blade diameter be reduced but not blade chord. This leads to a modified formula:

$$\text{Power} = C_p n^2 d^4$$
$$\text{Torque} = C_p n^2 d^4$$

For propellers of constant blade chord:
Hence $$\left(\frac{D}{d}\right)^4 = 5$$

$$\frac{D}{d} = 1.50$$

that is, the diameter reduction to cover a power coefficient range of 5 is 33⅓%.

This is actually less than the range afforded by the embodiments shown in the present specification, which afford about a 40% decrease in diameter $$\left(\frac{D}{d} \frac{10}{6} 1.66\right)$$

The calculation, however, does not take into account that the inboard section must be of slightly greater chord and thickness to accommodate the outboard section in a telescoping manner, hence, that a somewhat more than 33⅓% diameter change is necessary.

Figure 1:
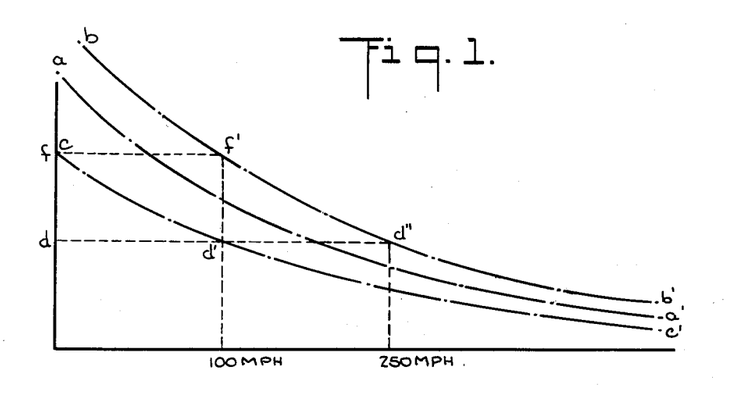
FIG. 1 is a graph charting efficiency of different diameter propellers at different speeds.

Now referring to FIG. 1, it may be seen just how this change in propeller diameter is effective in increasing the high speed of the convertiplane provided with a variable diameter rotor. FIG. 1 is a graph charting efficiency of different diameter propellers at different speeds. The curved line $aa'$ depicts the propeller diameter for maximum efficiency, the upper curve $bb'$ depicts the maximum propeller diameter for which efficiency is above an acceptable minimum and $cc'$ the minimum propeller diameter for which efficiency is above an acceptable minimum. The line $dd'd''$ is a horizontal line representing a given propeller diameter. The point $d'$ is its intersection with the curve $cc'$ and the point $d''$ the point of its intersection with the line $bb'$. Now consider the segment $d'd''$ of this line. This segment represents the operating range for a suitably designed craft using this diameter propeller, the points $d'$ and $d''$ representing its minimum and maximum speeds respectively, which might be say 100 and 250 m.p.h. Now consider the line $ff'$, which is illustrative of the diameter of a rotor of a helicopter or of a convertiplane, its capability of vertical take-off being indicated by the point $f$ being on the $y$ axis at zero velocity. Such a rotor thus has a maximum speed indicated by the $x$ coordinate of the point $f'$ of say 100 miles per hour. To go faster is impossible because in the region outside that bounded by the curves $aa'$ and $bb'$ the efficiency is not adequate for level flight.

A reduction of the diameter from the value $f$ to the value $d$ will however permit the craft to obtain the greater speed represented by the point $d''$, the maximum speed of a craft with a propeller of diameter $d$.

The diagram shows not only the range of speed available without change in diameter (the range $f$—$f'$) but the additional speed available when a diameter change is made possible, the stepped line $ff'$ $d'd''$. Conversion may be made gradually as speed is gained, the craft having surplus performance as long as it is interior of the boundaries of lines $bb'$ and $cc'$.

It is a primary object of this invention to provide a variable diameter propeller which is provided with means for extending and retracting the blades at the will of the pilot taking into consideration the very large stresses and forces that are acting on these blades at all times.

It is a primary object of this invention to provide a variable diameter propeller wherein the outboard sections of the blades can be retracted at the will of the operator while the propeller is in operation.

Further objects and features of this invention are the provision of several different means for retracting the retractible outboard section of the rotor blades. Three embodiments are described in detail below, the primary embodiment comprising a rotor blade, a hub, the rotor blade having a hollow inboard section and an outboard section, the outboard section being retractible within the inboard section and the inboard section secured to the hub. A cable extending longitudinally inside the inboard section of the rotor blade and secured to the inboard end of the outboard section is used for retracting the latter section. The cable is secured to a drum within the hub and is wound upon the same when the retracting means is actuated to retract the outboard section. A shaft driven by the engine supplies part of the total engine torque to first gear means and the drum to provide means for winding the cable thereon; part of the engine torque is also imparted to second gear means which function to rotate the hub and rotor blades. The first gear means is actuated to retract the cable only when the torque imparted thereto exceeds the centrifugal force acting on the outboard sections of the rotating rotor blades. When the first gear means is not rotating all of the engine power is transmitted through the second gear means to the hub and rotor blades. Stopping or locking means on the drum may also be provided to prevent actuation of the retracting means should the pilot so desire.

Other objects and features of this invention will become apparent from the description below and the accompanying drawings, it being understood that the instrumentalities of which this invention consists may be variously arranged and organized, and that this invention is not limited to the specific arrangement and organization of the instrumentalities as herein shown and described.

*Nacelles and Propeller Assemblies*

Figure 2:
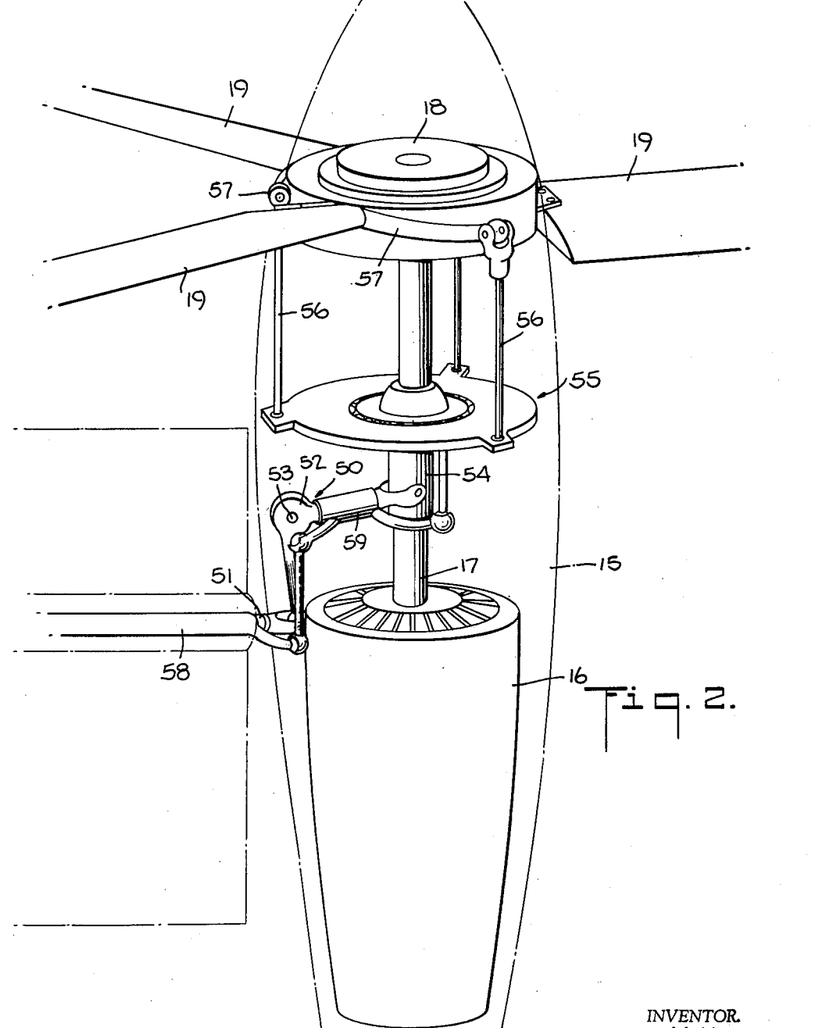
FIG. 2 is a fragmentary perspective view, partially sectional, of a nacelle with one of the propeller assemblies mounted thereon.

Referring to the drawings and first to FIG. 2, the reference character 15 denotes generally a nacelle adapted to house an engine 16 and mount a propeller assembly thereon. As shown, the engine 16 has a forwardly projecting drive shaft 17. Disposed at the outer end of this drive shaft is the propeller hub 18 having blades 19 mounted thereon.

*Blade Length Varying Mechanism*

Figure 3:
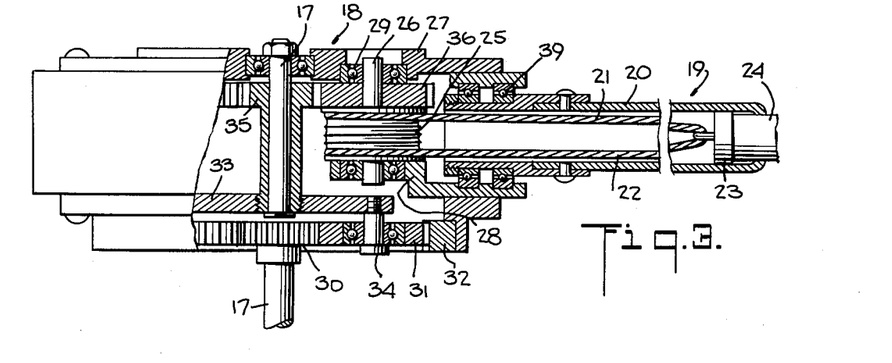
FIG. 3 is a side elevation view, in partial section, of a part of the propeller assembly showing propeller blade retracting means.
Figure 4:
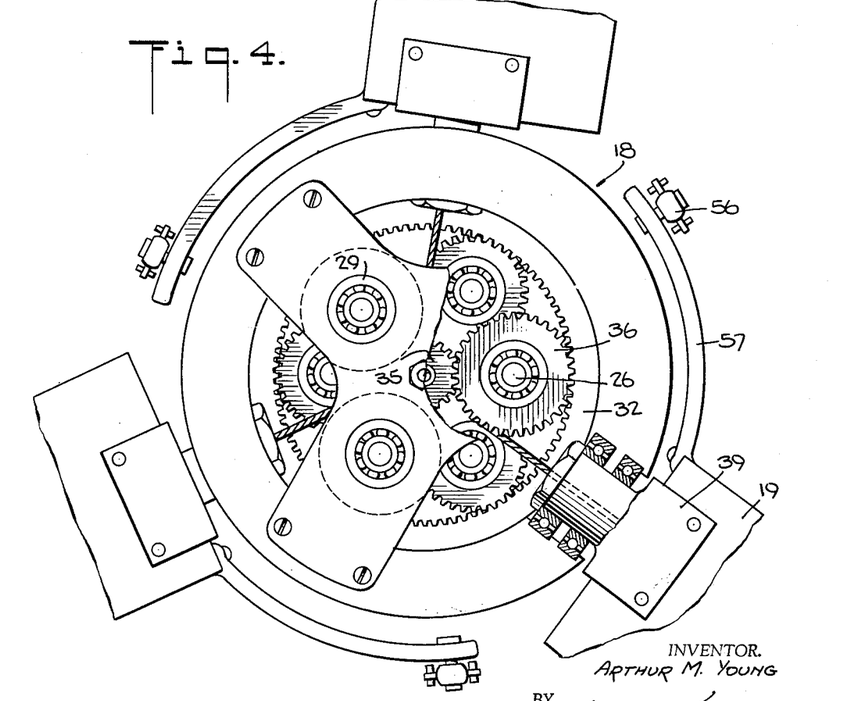
FIG. 4 is a plan view of the portion of the propeller assembly shown in FIG. 3.

Referring now to FIGS. 3 and 4, elevation and plan views of the primary embodiment of the retracting mechanism of this invention are illustrated. The hollow inboard section 20 of a single blade 19 is shown. Two cables 21, 22 are secured to the inboard end 23 of the outboard section of the blade 24. In this embodiment, cables 21, 22 provide the means for transmitting force for retracting outboard section 24, telescoping it within inboard section 20, so that the blade 19 when fully retracted is preferably about 50–60% the overall length of the extended blade. It should be recognized that this same mechanism may be used to retract the blades to a lesser degree if desired. Cables 21, 22 are secured to and wound around a drum 25 which is mounted on drum shaft 26. This drum shaft 26 is rotatably mounted within hub 18 between two drum mounting plates 27, 28 by means of journals 29.

Drive shaft 17 extends through hub 18 and is not directly attached or geared thereto. Splined to drive shaft 17 is sun gear 30 which transmits torque from the drive shaft to the drum 25 and hub 18 at all times in the following manner. Torque is transmitted to the hub 18 through a plurality of idler gears 31 which mesh with said sun gear 30 and with a planetary gear 32 which is mounted on and extends around the inner periphery of hub 18. Torque is transmitted to drum 25 through a spider 33 which is rotatably mounted on drive shaft 17 and extends adjacent a surface of said sun gear 30 and idler gears 31. Said idler gears are rotatably mounted on spindles 34 secured to said spider 33. Concentrically mounted on said spider is drum drive gear 35 which meshes with drum-driven gear 36 which is splined to drum shaft 26. Thus, any torque transmitted to spider 33 is transmitted to drum 25.

The division of engine power between the drum 25 and hub 18 is accomplished by the elements just described in the following manner. When the drum 25 is stopped, the spider 33 is held in a set position with respect to the hub and although the idler gears 31 attached thereto serve to transmit torque to both the spider and the hub, because of the immobility of the spider, they serve to transmit all of the power from the sun gear 30 to the hub. When conditions are right for drum rotation, such as when the blade is extended and the centrifugal force on the outboard section is less than the force exerted on the outboard blade section by the torque transmitted to the drum, then part of the power from the sun gear 30 will serve to rotate spider 33 with respect to the hub until drum 25 is again stopped.

The propeller assembly thus provides two paths for transmission of torque. One for driving the hub 18; the other for retracting outboard sections 24. Torque is transmitted along both paths at all times and is divided between them depending on pilot controlled operating conditions to be described more completely hereinafter.

If these conditions apply torque to the drum 25 which is opposed to and greater than the torque being transmitted via the drum path by the drive shaft power, then all of the drive shaft power will be transmitted to the hub. On the other hand, assuming conditions markedly decrease this opposing torque on the drum, then the spider and drum will be rotated with respect to the hub and a portion of the drive shaft power will be transmitted along both paths to rotate both the drum and the hub.

Figures 5, 7:
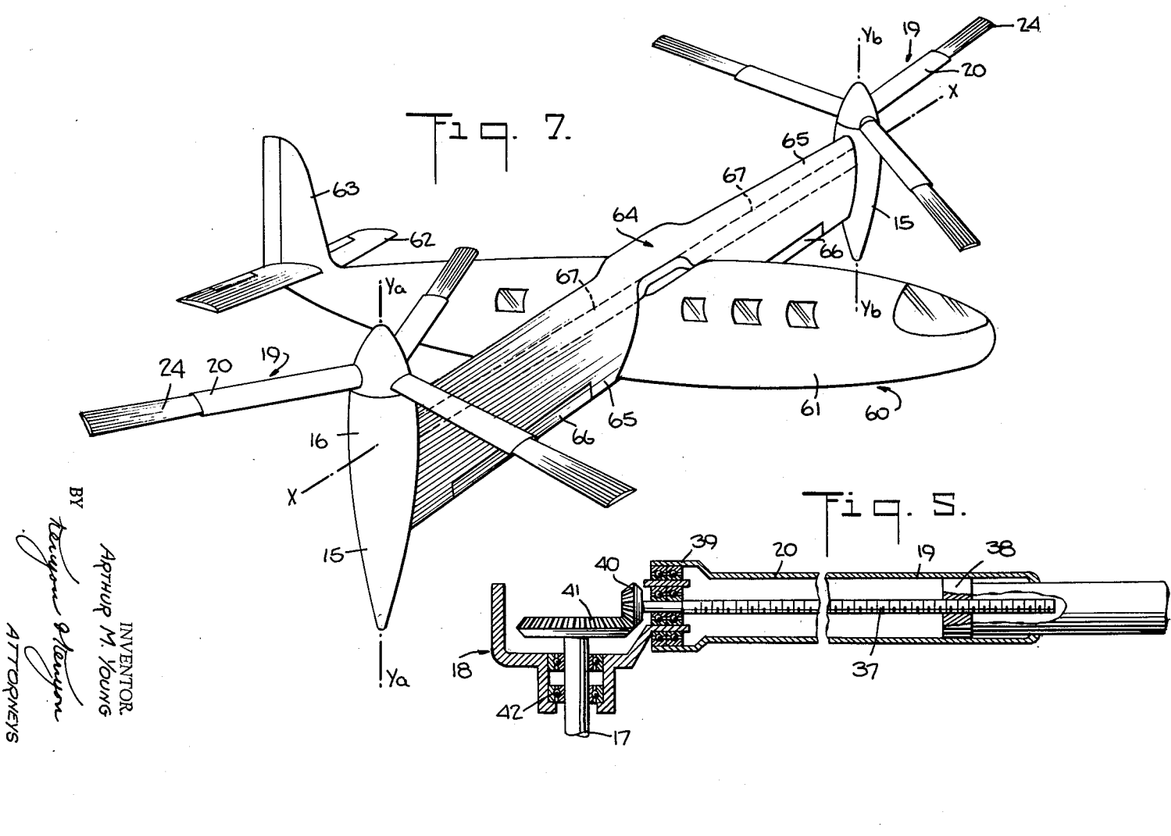
FIG. 5 is a side elevation view, in section, of a second embodiment of the retracting means of the invention.
FIG. 7 is a perspective view of a convertiplane utilizing the propellers of this invention in its initial vertical take-off position.

Referring to FIG. 5, a second embodiment of the propeller assembly of this invention is illustrated. In this embodiment, an elongated, steep pitched screw 37 is used to retract the outboard blade section 24. Screw 37 is engaged within an internally threaded nut 38 secured to the inboard end of the section 24. Screw 37 extends through the center of hollow rotor blade 19, through articulating means 39 to a first bevel gear 40 to which the screw is splined. First bevel gear 40 engages a large horizontal beveled pinion gear 41 which is splined on the extreme end of drive shaft 17. Hub 18 is provided with bearings 42 at the lower part thereof where shaft 17 enters hub 18. As in the the primary embodiment, hub 18 is driven only indirectly by drive shaft 17. A stop mechanism (not shown) provides means whereby the otherwise operable retracting means comprising screw 37 and nut 38 and gears 40, 41 may be rendered inoperable to retract or permit extension of section 24 and thus allow all of the torque of shaft 17 to be transmitted to hub 18. The two paths for the transmission of the torque are as follows:

From shaft 17 to pinion gear 41 to bevel gear 40 to screw 37 and nut 38. This retracts section 24. When the centrifugal force acting on the outboard section 24 of blade 19 is greater than the torque transmitted to the gear means described above, the screw 37 cannot retract section 24 and hence all the torque is delivered to blades 19 through pinion gear 41 and through stationary bevel gear 40. The force is applied, in this situation, through the stationary screw 37 directly to blades 19 causing rotation thereof. The latter state of affairs also exists when the stop mechanism is actuated. As in the first embodiment, torque is always delivered to assure rotation of the blades 19; a part of it may be drawn off to retract outboard sections 24 only when the balance of forces acting on the blades 19 permits.

Figure 6:
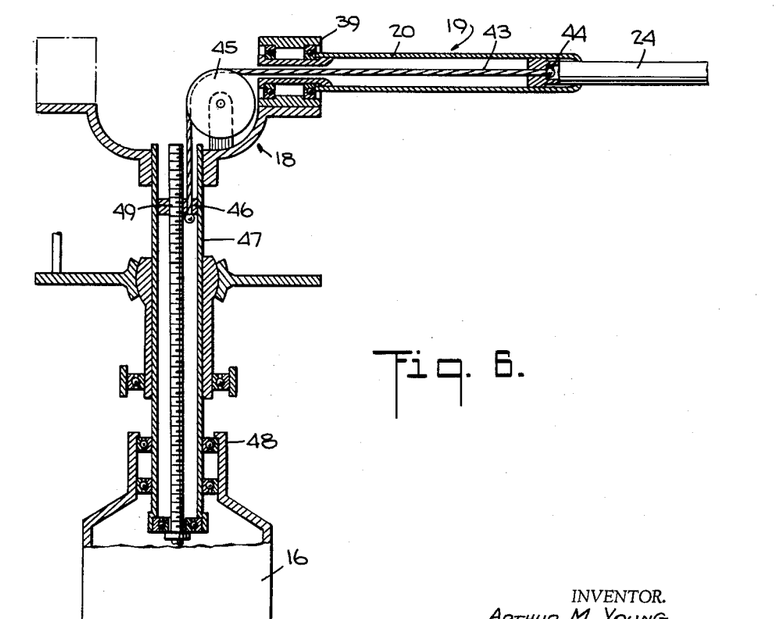
FIG. 6 is a side elevation view, in section, of a third embodiment of the retracting means of this invention.

Referring to FIG. 6, another embodiment of the retracting mechanism of this invention is shown. In this embodiment, a cable 43 is secured at one end 44 to the inboard end of outboard section 24. A pulley 45 is mounted for rotation in a vertical plane within hub 18. Cable 43 is passed over pulley 45, as shown, and is secured to an internally threaded nut 46 which is splined within hollow mast 47. Mast 47 is secured to hub 18 but is mounted on bearings 48 at the output portion of engine 16. Mast 47 is not driven directly by engine 16.

An elongated, steep pitch screw 49 extending from engine 16, through mast 47 and into hub 18, functions as a drive shaft. Screw 49 is engaged within nut 46, and hence may deliver torque thereto when the balance of forces permit causing nut 46 to advance toward engine 16 along screw 49. This causes retraction of cable 43 and outboard section 24.

This embodiment operates according to the same basic principle of the embodiments already described. When the centrifugal force acting on the blade exceeds the torque imparted to the retracting mechanism, the section 24 will not be retracted. All the torque may be transmitted from screw 49 to nut 46 and thence to mast 47 and hub 18 to which blades 19 are connected by articulating means 39. As in the earlier embodiments, torque is provided at all times to hub 18, but a portion of this torque may be drawn off in order to cause retraction, whenever that torque exerts a force that exceeds the centrifugal force acting on outer blade section 24.

Collective Pitch Controls

Referring again to FIG. 2, the propeller assembly of each of the embodiments of this invention may be provided with a collective pitch control mechanism 50 to provide collective pitch control of the blades 19. This collective pitch control mechanism comprises a conventional control stick and linkage (not shown) connecting said stick to shaft 51. These shafts 51 are adapted to be moved longitudinally with control stick movements. Shaft 51 is pivotally connected to one end of bell crank member 52 which is pivotally attached to the nacelle 15. The opposing end of said bell crank member is pivotally attached to sleeve 54 which is mounted concentrically on drive shaft 17 and is attached to the inner non-rotating portion of swashplate 55. Thus, longitudinal movements of shaft 51 in response to collective pitch control stick movements will cause swashplate 55 to move axially along drive shaft 17 and through links 56 and blade horns 57 to cause collective changes in the incidence settings of the blades 19.

Cyclic Pitch Controls

Again referring to FIG. 2, the propeller assembly of each of the embodiments of this invention may be provided with a cyclic pitch control mechanism. This mechanism comprises sleeve 58 rotatably mounted on shafts 51. This sleeve is attached by conventional linkages to a cyclic pitch control lever (not shown) in such a manner that sleeve 58 can be simultaneously rotated and/or moved longitudinally with respect to the wing structure to provide for tilting of the swashplate 55 in the longitudinal plane. These rotational and/or longitudinal movements of sleeve 58 are transmitted to the swashplate 55 by means of linkages 59 to the non-rotating portions of swashplate 55 to thus provide for tilting thereof to cyclically control the pitch of the blades 19 through rods 56 and blade pitch horns 57 in the conventional manner.

Aircraft Embodiments Utilizing the Propeller Assemblies of This Invention

It is contemplated that the described propeller assembly may be used on numerous convertiplane embodiments. The primary convertiplane embodiment provides a wing structure that is freely pivoted relative to the fuselage together with twin propeller assemblies carried on separate nacelles mounted on opposing sides of the fuselage. Each propeller assembly comprises a hub, at least one rotor blade mounted on the hub having an inboard and an outboard section, the outboard section having the capability of being retracted with respect to the inboard section, and means for retracting the outboard section which is actuated by the engine torque only when the force transmitted to this outboard section exceeds the centrifugal force acting upon it all in accordance with the above description. In conjunction with these elements, collective and cyclic pitch mechanisms for the rotors and controls therefor are provided in the convertiplane. Preferably, these controls are operable from a common location.

Other embodiments of this invention contemplate single or twin nacelles and rotor blade assemblies pivotably mounted on a stationary structure, each nacelle and assembly having the components described in the preceding paragraph.

The use of a pivotable wing structure in these embodiments provides the many advantages described in my United States Letters Patent No. 3,035,789, issued May 22, 1962, and entitled "Convertiplane."

Referring to FIG. 7, illustrating the primary convertiplane, the reference character 60 denotes generally an aircraft or convertiplane adapted to utilize the propeller assemblies of this invention. This aircraft 60 includes a conventional fuselage 61 constructed to conform to the requirements of minimum drag in forward flight. In the embodiment shown, the fuselage 61 is equipped with conventional rear elevators or tail construction 62 and a rudder 63. These conventional components may not be required.

A structure 64 comprising wings 65 extending symmetrically from opposite sides of the fuselage 61 is arranged thereon, preferably being an integral unit which is supported pivotally relative to the fuselage 61 for rotation on an axis X—X which is transversely disposed relative to the fore and aft fuselage direction in a manner to be presently described. The wings 65 in this embodiment have conventional wing sections for airplane type of flight and may be equipped with conventional ailerons 66 that are adapted to be operated by the pilot from the cockpit by conventional controls (not shown). Nacelles 15 are located respectively at symmetrically spaced-apart points on the wings on opposing sides of the fuselage. In the embodiment shown the nacelles shown are at the other extremities of the wings 65. Preferably, these nacelles 15 have conventional streamlined external contours. These nacelles contain respectively the engines, such as engine 16, shown in FIG. 2, of the aircraft. Each nacelle has mounted thereon a variable diameter propeller assembly in accordance with this invention as described above.

The respective wings 65 are mounted on freely rotatable coaxial shafts 67 (see FIG. 8) which extend laterally from opposite sides of fuselage 61 being supported respectively by bearings, carried by the framework (not shown) of the fuselage 61. The common axis X—X of the two aligned shafts 67 constitutes a free pivoting axis of the wing structure 65 as a unit relative to the fuselage 61. This pivoting axis X—X is preferably so disposed with respect to the wings 65 as to coincide with the line representing the center of pressure of the wing structure as a totality (wings, nacelles, rotor assemblies). Moreover, the center of gravity of the combined wing, nacelles, and rotor assemblies as a totality should preferably also be substantially on said pivoting axis. The first condition is required to prevent lift on the wing structure from causing a rotational couple on the wing structure with respect to its free pivoting axis X—X. The second condition minimizes the required control forces for orientation of the wing structure at a totality with respect to the fuselage 61. Further, if both conditions are substantially met there will be no center or gravity—center of pressure couple acting on the wing structure to turn it about the axis X—X.

Figure 8:
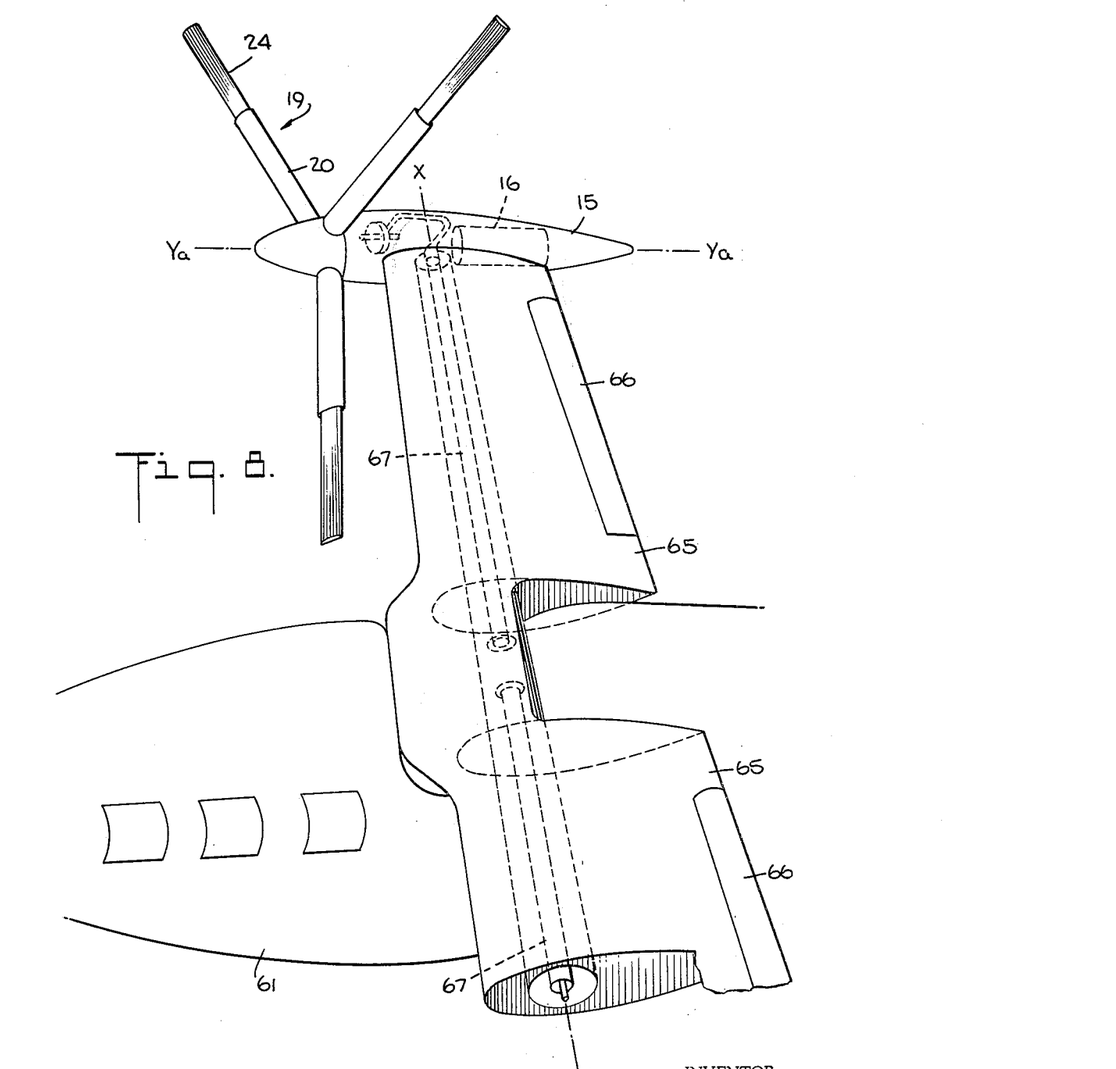
FIG. 8 is a fragmentary perspective view of the convertiplane of FIG. 7 shown in its forward horizontal flight position as in a conventional airplane.

Intentionally, no wing position control mechanism other than the cyclic pitch control of the propellers is provided to pivot the wing structure as a totality with respect to the fuselage 61 about said pivoting axis X—X. The ailerons 66 are provided to assure center of pressure placement on the rotational axis in a trimming sense. Experiments show that rotor blade assembly pitch control through a swashplate, as described above, is quite adequate for this purpose and has the added advantage of causing no torque reaction on the fuselage 61 which, being free in space, is incapable of resisting couples without additional structural provisions.

Figure 9:
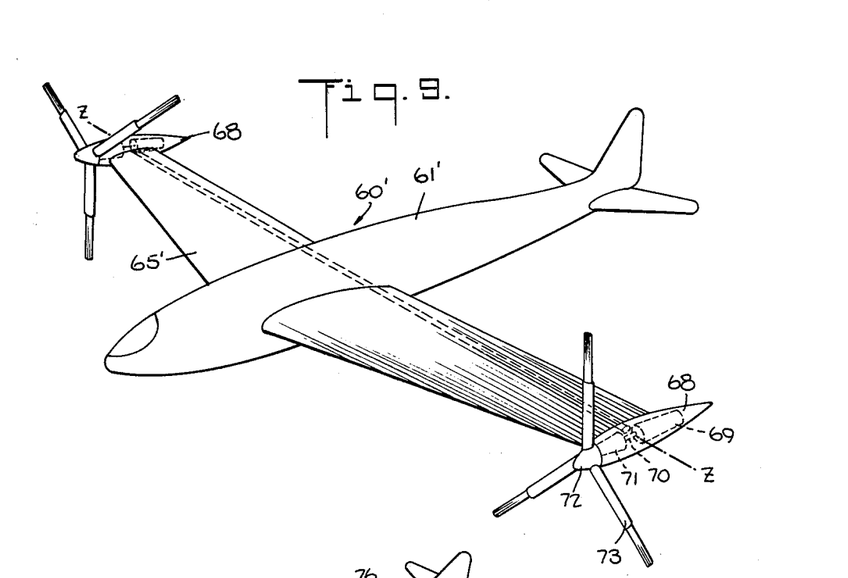
FIG. 9 is a perspective view of another embodiment of a convertiplane utilizing the propellers of this invention.

Other embodiments of the convertiplane equipped with propellers of this invention are contemplated. Referring to FIG. 9, a convertiplane 60' is provided with a stationary wing structure 65' mounted on a fuselage 61'. Other conventional structural components are provided so that convertiplane 60' may become airborne. Twin nacelles 68 are pivotally secured at spaced-apart points on wing structure 65'. The nacelles 68 pivot about an axis Z—Z which runs longitudinally through wing structure 65' and intersects the center of gravity of convertiplane 60'.

Nacelles 68 each contain an engine 69, drive shafts 70, control means 71, retracting means 72 and blades 73, each of the type described above with respect to the primary embodiment. This embodiment of the convertiplane functions in a fashion similar to that of the primary embodiment with the one exception that the nacelles 68 pivot with respect to the wing as distinguished from the entire wing structure and nacelles pivoting with respect to the fuselage as described above.

Figure 10:
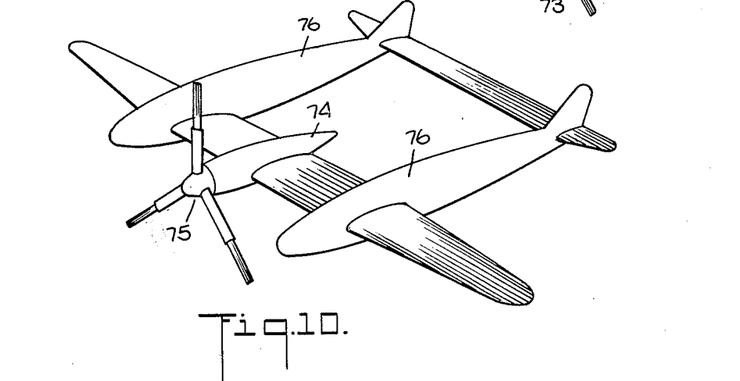
FIG. 10 is a perspective view of another embodiment of a convertiplane utilizing the propellers of this invention.

Still another embodiment of this invention is shown in FIG. 10. In this embodiment, a single nacelle 74, including a blade assembly 75 is pivotably secured to a stationary member between twin fuselages 76. This embodiment also functions like that of the primary embodiment described above except for the requirement of some anti-torque means to resist rotation of the fuselage when this embodiment is being operated as a helicopter.

*Operation*

The convertible aircraft or convertiplane equipped with a variable diameter propeller of this invention hereinabove described is adapted for vertical take-off or landing and for flight as a helicopter and may thereafter be converted into an airplane for high speed forward flight. In initial position on the ground the aircraft 60 has the wing disposition shown in FIG. 7 in which the wing chords are substantially vertical so that the axes $Y_a$—$Y_a$ and $Y_b$—$Y_b$ of the nacelles 15 stand substantially vertical with the propellers uppermost, and with all blades substantially horizontal. The engine in the respective nacelles 15 then serve to rotate the rotors about vertical axes. It is understood, of course, that the respective engines act to drive their shafts 17 in opposite directions so that the blades of one nacelle rotate in the opposite direction to the blades of the opposing nacelle, thus cancelling total rotative torque on the craft as a whole.

In order to take-off, the speed of the engine is increased and the blades 19 are maintained at a low collective pitch of from about 0°–4°. Initially, the outboard sections 24 are retracted and as the propellers come up to speed at low pitch the centrifugal force will draw the outboard sections out to their extreme positions. With the engine up to speed and the blades extended, the pilot next increases the collective pitch of the blades approximately 8°–10° until he achieves vertical take-off.

After vertical take-off has been effected in this manner, the pilot can, if he desires, continue to manipulate the craft as a helicopter for hovering, forward, backward or lateral flight merely by manipulation of the cyclic and collective pitch mechanisms in a conventional manner with the blades in their fully extended positions.

If he now desires to convert the aircraft into an airplane for high speed forward flight the pilot operates the cyclic pitch mechanism in a direction that causes forward tilt of the plane of both propellers or rotors. This simultaneously causes the wing structure 65 to swing forwardly about its pivoting axis X—X from the vertical position into a substantially horizontal position of FIGURE 7, at which time the drive shafts assume a horizontally disposed position. During this shift of the wing structure 65, and approximately at the time it reaches a horizontal position, the collective pitch control mechanisms are manipulated to considerably increase the pitch of all the blades. The drag of the blades of both propeller assemblies thus increases and their speed decreases. There is a corresponding decrease in centrifugal force on the outboard blade sections and when this force falls below the force exerted through the torque acting at all times on the retracting mechanism, the outboard sections 24 are retracted within inboard sections 20. With the outboard sections of the blades retracted and maintaining the blades at high pitch settings in the order of 45° the engine torques are used to rotate the propellers at a high r.p.m. as airplane propellers.

In both the fully retracted and fully extended positions of the outboard sections stop mechanisms (not shown) may be used to arrest longitudinal movement of the outboard sections. These mechanisms may be used at the will of the pilot to assure full extension or retraction regardless of the rotational speed of the blades, the engine torque or the collective pitch settings of the blades, if so desired.

In order to land the aircraft, the pilot throttles the engine back and reduces the collective pitch of the blades 19. This causes the rotor blades 19 to overrun the engines and increases the centrifugal force acting upon the rotating blades while the engine torque is reduced. The blades are then extended, converting the propellers to the helicopter configuration. Simultaneously, the cyclic pitch mechanisms are actuated to cause pivoting of the wing structure on the X—X axis back to its original position wherein the axes $Y_a$—$Y_a$ and $Y_b$—$Y_b$ of the nacelles 15 are substantitally vertical. The convertiplane may now be landed like a conventional helicopter.

While specific embodiments of this invention have been described, variations within the scope of the appended claims are possible and are contemplated. There is no intention, therefore, of limiting this invention to the exact details described herein.

What is claimed is:

1. A variable diameter propeller assembly comprising at least one blade having an outboard and an inboard section, said outboard section retractable with respect to said inboard section, means for retracting said outboard section, and driving means for rotating said blade and imparting torque to said retracting means, said retracting means actuated when said torque imparted thereto exerts a force on the outboard section of said rotating blade that exceeds the centrifugal force exerted on the outboard section of said rotating blade.

2. A retractable propeller assembly for use with an aircraft comprising a hub, a blade secured to said hub, said blade having an inboard section and an outboard section, said outboard section retractable within said inboard section, means operable from said hub within said blade to retract said outboard section, and driving means for rotating said blade and imparting torque to said retracting means, said retracting means actuated when said torque imparted thereto exerts a force on the outboard section of said rotating blade that exceeds the centrifugal force exerted on the outboard section of said rotating blade.

3. A variable diameter propeller assembly for use with a convertiplane type aircraft, comprising a hub, at least one blade secured to said hub, driving means for rotating said blade, said blade having an outboard and inboard section, said outboard section retractable within said inboard section, and means within said hub and blade for retracting said outboard section, said driving means imparting torque to said retracting means which is operable to retract said outboard section to the extent that the said torque imparted to said retracting means exerts a force on the outboard section of said rotating blade that exceeds the centrifugal force exerted on the outboard section of said rotating blade.

4. A retractable propeller assembly for use with an aircraft comprising a hub, at least one blade, said blade having an outboard section and a hollow inboard section, said inboard section secured to said hub, said outboard section retractable within said inboard section, a cable for retracting said outboard section, said cable situated within said inboard section and secured near the inner end of said outboard section, a drum within said hub to which said cable is secured, an engine, first means for transmitting torque from said engine to said drum and second means for transmitting torque from said engine to said hub causing rotation of said blade, said first means and said drum actuated to retract said outboard section only when said torque imparted thereto exerts a force on the outboard section of said rotating blade that exceeds the centrifugal force acting on the outboard section of said rotating blade.

5. A retractable propeller assembly for use with an aircraft comprising a hub, a blade, said blade having an outboard and a hollow inboard section, said inboard section secured to said hub, said outboard section retractable within said inboard section, a cable for retracting said outboard section, said cable situated within said inboard section and secured near the inner end of said outboard section, a drum within said hub to which said cable is secured, a shaft, an engine for supplying torque to said shaft, first gear means for transmitting torque from said shaft to said drum to wind said cable thereon and second gear means for transmitting torque from said shaft to said hub causing rotation of said blade, said first gear means and said drum actuated to retract said outboard section only when said torque transmitted thereto exerts a force on the outboard section of said rotating blade that exceeds the centrifugal force acting upon the outboard section of said rotating blade.

6. A retractable propeller assembly for use with an aircraft comprising a hub, a blade, said blade having an outboard and a hollow inboard section, said inboard section secured to said hub, said outboard section retractable within said inboard section, a cable for retracting said outboard section, said cable situated within said inboard section and secured near the inner end of said outboard section, a drum within said hub to which said cable is secured, a shaft, an engine supplying torque to said shaft, first gear means for transmitting part of said torque from said shaft to said drum to wind said cable thereon, and second gear means for transmitting part of said torque from said shaft to said hub causing rotation of said hub and rotor blade, said first gear means actuated to rotate said drum only when said torque transmitted thereto exerts a force on the outboard section of said rotating blade that exceeds the centrifugal force acting on the outboard section of said rotating blade, said second gear means transmitting all of said torque from said shaft to said hub when said first gear means has caused maximum retraction of said outboard section of said blade.

7. A variable diameter propeller assembly for use with an aircraft comprising a hub, a blade, said blade having an outboard and a hollow inboard section, said inboard section secured to said hub, said outboard section retractable within said inboard section, screw means within said blade for retracting said outboard section, driving means, torque transmitting means within said hub for transmitting torque from said driving means to said screw means and to said hub and said blade, said screw means retracting said outboard section only when said torque transmitted thereto exerts a force on the outboard section of said rotating blade that exceeds the centrifugal force acting on the outboard section of said rotating blade.

8. A retractable propeller assembly for use with an aircraft comprising a hub, a blade, said blade having an outboard and a hollow inboard section, said inboard section secured to said hub, said outboard section retractable within said inboard section, an internally threaded nut secured to the inner end of said outboard section, an externally threaded screw within the inboard section of said blade for retracting said outboard section, said screw engaging said nut, a shaft, an engine for supplying torque to said shaft, gear means within said hub for transmitting torque from said shaft to said screw and said hub and said blade, said screw retracting said outboard section only when said torque transmitted thereto exerts a force on the outboard section of said rotating blade that exceeds the centrifugal force acting on the outboard section of said rotating blade.

9. A retractable propeller assembly for use with an aircraft comprising a hub, a blade, said blade having an outboard and a hollow inboard section, said inboard section secured to said hub, said outboard section retractable within said inboard section, a cable for retracting said outboard section, said cable situated within the inboard section of said blade and secured near the inner end of said outboard section, a drum rotatably mounted within said hub, an engine, a hollow mast interconnecting said engine and hub, said mast secured to said hub, an elongated externally threaded screw for transmitting torque from said engine, said screw extending through said mast and an internally threaded nut freely movable within said mast and splined thereto, said screw threaded into said nut, said cable wound over said drum and secured to said nut such that said screw transmits torque to said nut and to said mast and said hub, said torque causing rotation of said blade, said nut exerting a force on said cable and retracting said outboard section only when said torque exerts a force on the outboard section of said rotating blade that exceeds the centrifugal force exerted on the outboard section of said rotating blade.

References Cited in the file of this patent
UNITED STATES PATENTS

| | | |
|---|---|---|
| 1,922,866 | Rosenberg et al. | Aug. 15, 1933 |
| 2,163,482 | Cameron | Aug. 20, 1939 |
| 2,989,268 | Andrews | June 20, 1961 |
| 3,035,789 | Young | May 22, 1962 |

UNITED STATES PATENT OFFICE
CERTIFICATE OF CORRECTION

Patent No. 3,128,829　　　　　　　　　　　　April 14, 1964

Arthur M. Young

It is hereby certified that error appears in the above numbered patent requiring correction and that the said Letters Patent should read as corrected below.

Column 9, after line 73, insert the following:

Referring to FIGS. 8, 9 and 10 it will be appreciated that the convertiplane embodiments shown are converted to airplane configurations for high speed forward flight and that the outboard sections of the propeller blades should be telescoped within the inboard sections thereof although these illustrations do not show such telescoping.

(SEAL)　　　　Signed and sealed this 20th day of April 1965.

Attest:

ST W. SWIDER
ing Officer

EDWARD J. BRENNER
Commissioner of Patents